(12) United States Patent
Li (10) Patent No.: US 10,613,337 B2
(45) Date of Patent: Apr. 7, 2020

(54) METHOD AND APPARATUS FOR ADJUSTING IMAGING POSITION AND HEAD-UP DISPLAY SYSTEM

(71) Applicant: BOE TECHNOLOGY GROUP CO., LTD., Beijing (CN)

(72) Inventor: Dianmeng Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/172,152

(22) Filed: Oct. 26, 2018

(65) Prior Publication Data

US 2019/0302464 A1 Oct. 3, 2019

(30) Foreign Application Priority Data

Mar. 27, 2018 (CN) .......................... 2018 1 0258879

(51) Int. Cl.
 *G02B 27/01* (2006.01)
 *G06F 3/01* (2006.01)
 *B60K 35/00* (2006.01)
 *G02F 1/1334* (2006.01)

(52) U.S. Cl.
 CPC ..... *G02B 27/0179* (2013.01); *G02B 27/0101* (2013.01); *G06F 3/013* (2013.01); *B60K 35/00* (2013.01); *B60K 2370/1529* (2019.05); *B60K 2370/334* (2019.05); *B60K 2370/52* (2019.05); *G02B 2027/014* (2013.01); *G02B 2027/0138* (2013.01); *G02B 2027/0181* (2013.01); *G02B 2027/0187* (2013.01); *G02F 1/1334* (2013.01); *G02F 2203/12* (2013.01)

(58) Field of Classification Search
 CPC ....... G02B 27/01–0149; G02B 27/0179–0189; G02B 2027/0105–0169; G02B 2027/0181–0198; B60K 2370/1529
 See application file for complete search history.

(56) References Cited

U.S. PATENT DOCUMENTS

| | | | |
|---|---|---|---|
| 6,926,429 B2* | 8/2005 | Barlow | A61B 3/113 340/576 |
| 10,067,561 B2* | 9/2018 | San Agustin Lopez | G06F 3/013 |
| 10,247,941 B2* | 4/2019 | Fursich | G02B 27/0093 |
| 10,288,882 B2* | 5/2019 | Ishikawa | G09G 5/38 |
| 2015/0145777 A1* | 5/2015 | He | G06K 9/0061 345/158 |
| 2016/0085301 A1* | 3/2016 | Lopez | G06F 3/013 345/156 |

(Continued)

FOREIGN PATENT DOCUMENTS

| | | |
|---|---|---|
| AU | 2015320043 A1 | 4/2017 |
| CA | 2961830 A | 3/2016 |

(Continued)

*Primary Examiner* — Gene W Lee
(74) *Attorney, Agent, or Firm* — Kinney & Lange, P.A.

(57) ABSTRACT

The present disclosure discloses a method and apparatus for adjusting an imaging position, which is applied to a head-up display apparatus. The method includes: acquiring eye feature parameters of a user; analyzing the eye feature parameters to acquire gazing information of the user; determining adjustment parameters of the head-up display apparatus according to the gazing information; and adjusting the imaging position of the head-up display apparatus according to the adjustment parameters.

11 Claims, 3 Drawing Sheets

(56) References Cited

U.S. PATENT DOCUMENTS

| | | | |
|---|---|---|---|
| 2016/0195927 A1* | 7/2016 | Lopez | G06F 3/013 348/78 |
| 2018/0239136 A1* | 8/2018 | Ishikawa | H04N 13/383 |
| 2018/0373033 A1* | 12/2018 | Oshima | B60K 35/00 |
| 2019/0004600 A1* | 1/2019 | Wu | G06F 3/013 |
| 2019/0025580 A1* | 1/2019 | Nagano | G01C 21/365 |
| 2019/0139286 A1* | 5/2019 | Shimoda | B60K 35/00 |
| 2019/0278094 A1* | 9/2019 | Huang | G02B 27/0179 |

FOREIGN PATENT DOCUMENTS

| | | |
|---|---|---|
| CN | 107003521 A | 8/2017 |
| WO | 2016045784 A1 | 3/2016 |

\* cited by examiner

METHOD AND APPARATUS FOR ADJUSTING IMAGING POSITION AND HEAD-UP DISPLAY SYSTEM

CROSS-REFERENCE TO RELATED APPLICATION

This application claims priority to the Chinese Patent Application No. CN201810258879.8, filed on Mar. 27, 2018, which is incorporated herein by reference in its entirety.

BACKGROUND

The present disclosure relates to the field of display technology, and more particularly, to a method and apparatus for adjusting an imaging position and a head-up display system.

Head-Up Displays (HUDs) are a kind of vehicle-mounted visual aid systems. A head-up display projects vehicle state information such as a vehicle speed, fuel quantity etc. and indication information such as navigation and danger warnings etc. to be displayed at a suitable position in front of a driver. HUDs allow a driver's line of sight to not deviate from a road in front of the driver, reducing or eliminating blind spots caused by looking down at a dashboard, and thereby improving driving safety.

However, in different road conditions, the driver gazes at real scenes at different positions in front of the driver. For example, in a condition of a highway or a spacious road, the driver may gaze at a scene at a distant position; and in a condition of a crowded urban area, the driver may gaze at a scene at a proximal position. An existing HUD provides imaging at a position about 2 meters in front of the driver. When the vehicle is on a spacious road or a highway, the driver needs to switch the line of sight between the distal position and the proximal position, which can cause safety risks in this process.

SUMMARY

According to a first aspect, the present disclosure provides a method for adjusting an imaging position, which is applied to a head-up display apparatus, comprising: acquiring eye feature parameters of a user; analyzing the eye feature parameters to acquire gazing information of the user; determining adjustment parameters of the head-up display apparatus according to the gazing information; and adjusting the imaging position of the head-up display apparatus according to the adjustment parameters.

In an embodiment, the head-up display apparatus comprises a diffusion screen and a concave mirror, and determining adjustment parameters of the head-up display apparatus according to the gazing information comprises: determining a target position coordinate of the diffusion screen and a target angle coordinate of the concave mirror according to the gazing information.

In an embodiment, the head-up display apparatus further comprises a spatial light modulator, and adjusting the imaging position of the head-up display apparatus according to the adjustment parameters comprises: adjusting a position of the diffusion screen according to the target position coordinate of the diffusion screen; and adjusting an angle of the concave mirror according to the target angle coordinate of the concave mirror; and acquiring a target focal length of a lens corresponding to kinoform of the lens loaded in the spatial light modulator according to the target position coordinate of the diffusion screen, and adjusting a focal length of the lens according to the target focal length to adjust the imaging position of the head-up display apparatus.

In an embodiment, adjusting a position of the diffusion screen according to the target position coordinate of the diffusion screen comprises: triggering a position adjustment mechanism of the diffusion screen to adjust the position of the diffusion screen according to the target position coordinate of the diffusion screen.

In an embodiment, the diffusion screen comprises multiple polymer dispersed liquid crystal films, and adjusting a position of the diffusion screen according to the target position coordinate of the diffusion screen comprises: adjusting voltages of respective polymer dispersed liquid crystal films according to the target position coordinate of the diffusion screen, so that a polymer dispersed liquid crystal film corresponding to the target position coordinate is in a diffusion state.

In an embodiment, the eye feature parameters comprise a pupil center position, a pupil size, corneal reflection information, an iris center position, and an iris size; and the gazing information comprises gazing time, a gazing direction, and a gazing convergence depth.

In an embodiment, before determining adjustment parameters of the head-up display apparatus according to the gazing information, the method further comprises: determining whether the gazing time exceeds a threshold time, and when the gazing time exceeds the threshold time, determining adjustment parameters of the head-up display apparatus according to the gazing information.

According to a second aspect, the present disclosure further provides an apparatus for adjusting an imaging position, which is applied to a head-up display apparatus, comprising:

an image collector configured to acquire eye feature parameters of a user; a processor configured to analyze the eye feature parameters to acquire gazing information of the user, and determine adjustment parameters of the head-up display apparatus according to the gazing information; and a controller configured to adjust the imaging position of the head-up display apparatus according to the adjustment parameters.

In an embodiment, the head-up display apparatus comprises a diffusion screen and a concave mirror, and the adjustment parameters comprise a target position coordinate of the diffusion screen and a target angle coordinate of the concave mirror.

In an embodiment, the head-up display apparatus further comprises a spatial light modulator, and the controller comprises: a position adjuster configured to adjust a position of the diffusion screen according to the target position coordinate of the diffusion screen; an angle adjuster configured to adjust an angle of the concave mirror according to the target angle coordinate of the concave mirror; and a focal length adjuster configured to acquire a target focal length of a lens corresponding to kinoform of the lens loaded in the spatial light modulator according to the target position coordinate of the diffusion screen, and adjust focal length of the lens according to the target focal length to adjust the imaging position of the head-up display apparatus.

In an embodiment, the position adjuster comprises a trigger configured to trigger a position adjustment mechanism of the diffusion screen to adjust the position of the diffusion screen according to the target position coordinate of the diffusion screen.

In an embodiment, the diffusion screen comprises multiple polymer dispersed liquid crystal films, and the position adjuster comprises: a voltage adjuster configured to adjust voltages of respective polymer dispersed liquid crystal films according to the target position coordinate of the diffusion screen, so that a polymer dispersed liquid crystal film corresponding to the target position coordinate is in a diffusion state.

In an embodiment, the eye feature parameters comprise a pupil center position, a pupil size, corneal reflection information, an iris center position, and an iris size; and the gazing information comprises gazing time, a gazing direction, and a gazing convergence depth.

In an embodiment, the apparatus further comprises: a comparator configured to, before the processor determines the adjustment parameters of the head-up display apparatus according to the gazing information, compare the gazing time with a threshold time, wherein when the gazing time exceeds the threshold time, the processor acquires the adjustment parameters of the head-up display apparatus according to the gazing information.

According to a third aspect, the present disclosure further provides a head-up display system, comprising a head-up display apparatus and the apparatus described above.

DETAILED DESCRIPTION

The technical solutions in the embodiments of the present disclosure will be clearly and completely described below in conjunction with accompanying drawings in the embodiments of the present disclosure. The illustrative embodiments described in detail below are not intended as an exhaustive list of embodiments. All other embodiments obtained by those of ordinary skill in the art based on the present disclosure without any creative work fall within the protection scope of the present disclosure.

Figure 1:
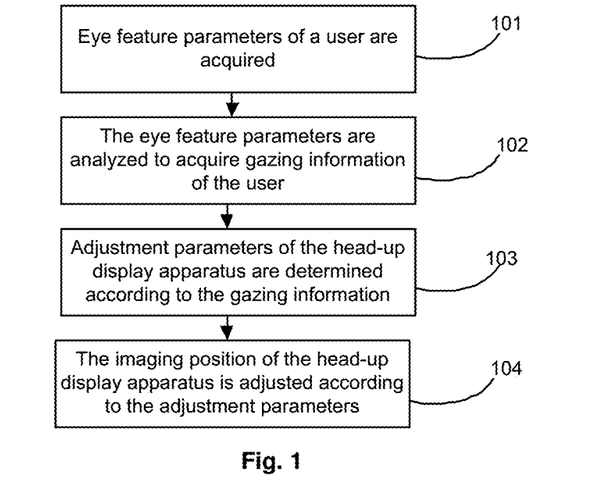
FIG. 1 is a flowchart illustrating a method for adjusting an imaging position according to an embodiment of the present disclosure.

A method for adjusting an imaging position according to an embodiment of the present disclosure is applied to a head-up display apparatus. As shown in FIG. 1, illustrated is a flowchart of the method for adjusting an imaging position according to the embodiment of the present disclosure. The method specifically comprises the following steps.

In step 101, eye feature parameters of a user are acquired.

An execution body of the step may be a monitoring system for adjusting the imaging position. This system may comprise hardware such as an Infrared Ray (IR) light source and a camera etc., or may also be an image collector. This system may be integrated in a device such as a computer, a processor etc., or may be disposed separately from a device such as a computer, a processor etc. In this step, for example, states of a head and eyes of a user may be monitored and an eye image of the user may be collected in real time through the IR light source and the camera or through the image collector, and eye feature parameters of the user are acquired by analyzing the eye image. The eye feature parameters of the user may comprise any one or more of information of the user's eyes, such as a pupil center position, a pupil size, corneal reflection information, an iris center position, an iris size, etc. The head-up display apparatus may be applied to a car or an aircraft etc., and the user may be a driver or a passenger.

In step 102, the eye feature parameters are analyzed to acquire gazing information of the user.

By analyzing the eye feature parameters acquired in the above step, gazing information of the user may be acquired, for example, information such as a gazing direction, a gazing convergence depth, and gazing time etc. of the user may be acquired. Specifically, for example, different eye feature parameter information may be acquired by acquiring eye images of the user at intervals of preset duration, and the information is input to a calculation module of, for example, a processor for calculation. The gazing time of the user may be acquired through changes in the pupil size, the pupil center position, the iris center position and the iris size; the gazing direction may be determined according to a position of the corneal reflection information of a light source which is measured relative to a pupil center; and the gazing convergence depth may be determined by comprehensively analyzing the pupil size, the pupil center position, the iris center position, the iris size and the corneal reflection information.

It can be understood that the above description is an example for better understanding the technical solutions according to the embodiments of the present disclosure, and in the existing technical solutions, any algorithm for extracting eye feature parameters from a human eye image, and acquiring gazing information of a user according to the eye feature parameters may be applied to the embodiments of the present disclosure, and details thereof will not be described herein again.

In step 103, adjustment parameters of the head-up display apparatus are determined according to the gazing information.

A gazing position of the user may be determined according to the above gazing information, and then parameters of respective components of the head-up display apparatus, which correspond to the gazing position and need to be adjusted, are calculated and determined by a computing apparatus such as a processor using the geometrical optical principle. The adjustment parameters may be a target position coordinate of a diffusion screen of the head-up display apparatus and a target angle coordinate of a concave mirror of the head-up display apparatus.

In step 104, the imaging position of the head-up display apparatus is adjusted according to the adjustment parameters.

After the adjustment parameters are acquired, the head-up display apparatus is adjusted according to the adjustment parameters, thereby adjusting the imaging position of the head-up display apparatus, so that the imaging position of the head-up display apparatus coincides with the gazing position of the user.

For example, when the adjustment parameters comprise the target position coordinate of the head-up display apparatus and the target angle coordinate of the concave mirror, a position of the concave mirror and an angle of the concave mirror may be adjusted respectively according to the two parameters, and a target focal length of a lens corresponding to kinoform of the lens loaded in a spatial light modulator of the head-up display apparatus may further be acquired according to the target position coordinate of the diffusion screen, so that a focal length of the lens is adjusted according to the target focal length, to adjust the imaging position of the head-up display apparatus.

The method for adjusting an imaging position according to the embodiment of the present disclosure is applied to the head-up display apparatus, to firstly acquire eye feature parameters of a user, analyze the eye feature parameters to acquire gazing information of the user, thereby further determining adjustment parameters of the head-up display apparatus, and adjust the imaging position of the head-up display apparatus according to the adjustment parameters. The method for adjusting an imaging position may be used to adjust the imaging position of the head-up display apparatus to coincide with the gazing position of the user, which can effectively prevent security risks caused by switching between a distal position and a proximal position when the imaging position does not coincide with the gazing position of the user.

Figure 2:
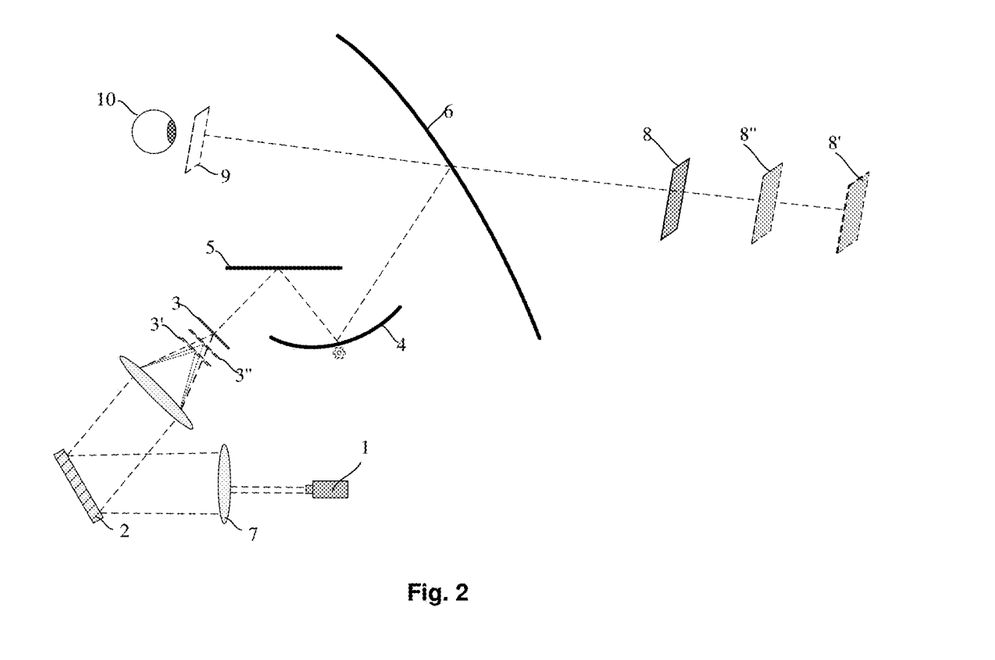
FIG. 2 is a schematic structural diagram of a head-up display apparatus according to an embodiment of the present disclosure.

Based on the above embodiment, the head-up display apparatus may have a structure as follows. As shown in FIG. 2, the head-up display apparatus comprises: a light source 1 configured to emit a beam to be modulated; and a Spatial Light Modulator (SLM) 2 configured to load a composite kinoform (a kinoform of a target image and kinoform of a lens) based on the target image, to perform phase modulation on the beam to be modulated; a collimated beam expander group 7 configured to convert the beam to be modulated which is emitted by the light source 1 into a collimated beam to be modulated, and emit the collimated beam to be modulated to the SLM 2; a diffusion screen 3 configured to reproduce the target image; a concave mirror 4 configured to adjust an imaging angle of the target image; and a planar mirror 5 configured to reflect light from the diffusion screen 3 to the concave mirror 4.

The beam emitted by the light source 1 is expanded by the collimation beam expander group 7 to reach a working region of the SLM, the SLM performs phase modulation on the beam according to a phase delay distribution of the loaded kinoform, and a beam emitted by the SLM passes through a Fourier lens to reproduce a target image on the diffusion screen 3. The target image of the diffusion screen 3 is reflected into the user's eyes 10 through mirrors (the planar mirror 5 and the concave mirror 4) and a windshield 6, and a virtual image 8 of the head-up display apparatus is presented at a position in front of the user. In FIG. 2, if images are reproduced respectively on diffusion screens at different positions, for example, the diffusion screen 3, a diffusion screen 3', and a diffusion screen 3" as shown in FIG. 2, corresponding virtual images, for example, the virtual image 8, a virtual image 8', and a virtual image 8", are also located at different positions.

It should be illustrated that the spatial light modulator 2 may load different composite kinoforms of a target image in a time-division manner, wherein the composite kinoform of the target image is obtained by superimposing a kinoform of the target image and kinoform of a lens. Kinoforms of the lens in different composite knoforms of the same target image correspond to different lens focal lengths, and the target image may be reproduced at different positions.

Figure 3:
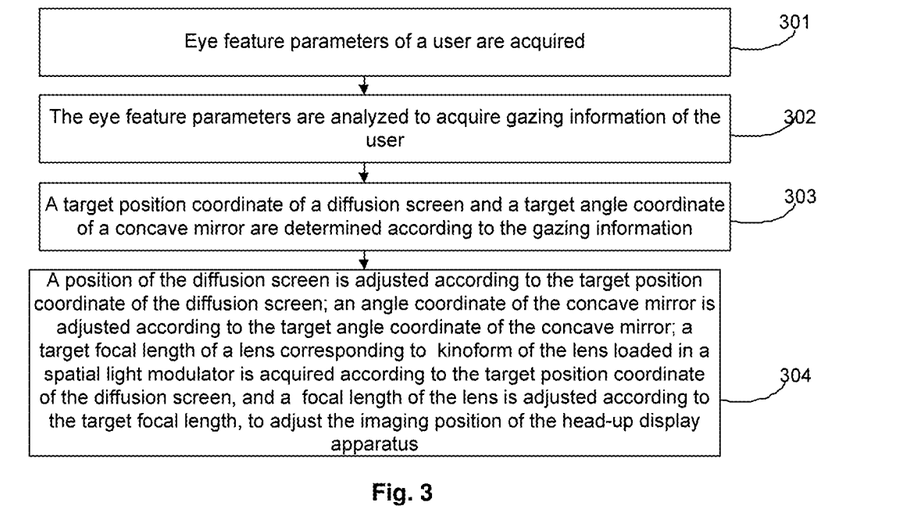
FIG. 3 is a flowchart illustrating another method for adjusting an imaging position according to an embodiment of the present disclosure.

A shown in FIG. 3, illustrated is a flowchart of another method for adjusting an imaging position according to an embodiment of the present disclosure, which is applied to the head-up display apparatus described above. The method comprises the following steps.

In step 301, eye feature parameters of a user are acquired.

In this step, the eye feature parameters of the user may specifically comprise a pupil center position, a pupil size, corneal reflection information, an iris center position, and an iris size.

In step 302, the eye feature parameters are analyzed to acquire gazing information of the user.

The gazing information of the driver is calculated and analyzed according to the driver's pupil center position, pupil size, corneal reflection information, iris center position and iris size in step 301. The gazing information comprises information such as gazing time, a gazing direction, and a gazing convergence depth etc.

In step 303, a target position coordinate of a diffusion screen and a target angle coordinate of a concave mirror are determined according to the gazing information.

The imaging position of the head-up display apparatus may be determined according to the gazing information, and then a corresponding position coordinate of the diffusion screen and a corresponding angle coordinate of the concave mirror may be calculated using the geometrical optical principle.

Specifically, an optical system of the head-up display apparatus is composed of a planar mirror 5, a concave mirror 4, and a windshield 6. For the convenience of understanding, an equivalent optical system of the entire optical system may be obtained. A focal length of the equivalent optical system is set to f, a distance (object distance) between the diffusion screen 3 and the equivalent optical system is set to od, and a distance (image distance) between the imaging position of the virtual image 8 (image obtained through the head-up display apparatus) and the equivalent optical system is set to vd. Then, a relationship among the above three parameters may be obtained as follows according to a Gaussian formula of the geometric optics:

$$\frac{1}{od} - \frac{1}{vd} = \frac{1}{f} \tag{1}$$

Then, assuming that the focal length of the equivalent optical system is f=200 mm, the distance between the user and the windshield is 800 mm, an imaging distance of the virtual image is 5000 mm, the image distance is vd=5000−800=4200 mm, and the object distance od=190.91 mm may be calculated according to formula (1). Similarly, when the imaging distance of the virtual image is 5500 mm, 6000 mm, 6500 mm, 7000 mm and 7500 mm, the object distance may be calculated to be 191.84 mm, 192.59 mm, 193.22 mm, 193.75 mm and 194.20 mm.

According to the above calculation process, a specific position coordinate of the diffusion screen may be obtained. The calculation process is a rough calculation, and error compensation calculation may further be performed on data in a device such as a computer or a processor etc., to acquire a more accurate value of the position coordinate of the diffusion screen. It can be understood that the above description is merely illustrative, and other specific values may also be possible.

The concave mirror 4 may be rotated to adjust a top view angle at which the user views the image obtained through the head-up display apparatus. As shown in FIG. 2, when the concave mirror 4 is rotated clockwise, the top view angle becomes larger, and the image viewed by the user moves downward; and when the concave mirror 4 is rotated counterclockwise, the top view angle becomes smaller, and the image viewed by the user moves upward. A value of the angle coordinate of the concave mirror matching the gazing position of the user may be acquired according to the gazing position of the user, and the concave mirror 4 is adjusted to a suitable angle.

In step 304, a position of the diffusion screen is adjusted according to the target position coordinate of the diffusion screen; an angle coordinate of the concave mirror is adjusted according to the target angle coordinate of the concave mirror; a target focal length of a lens corresponding to kinoform of the lens loaded in a spatial light modulator is acquired according to the target position coordinate of the diffusion screen, and a focal length of the lens is adjusted according to the target focal length, to adjust the imaging position of the head-up display apparatus.

The adjustment of the position of the diffusion screen will be described in detail. When the head-up display apparatus further comprises a position adjustment mechanism of the diffusion screen, the step of adjusting the position of the diffusion screen according to the target coordinate of the diffusion screen may specifically comprise: triggering the position adjustment mechanism of the diffusion screen to adjust the position of the diffusion screen according to the target position coordinate of the diffusion screen. The position adjustment mechanism may be a mechanical structure such as a mechanical arm, a connecting rod etc., and a specific structure thereof is not limited by the present disclosure.

When the diffusion screen comprises multiple polymer dispersed liquid crystal films, the step of adjusting the position of the diffusion screen according to the target position coordinate of the diffusion screen may specifically comprise: adjusting voltages of respective polymer dispersed liquid crystal films according to the target position coordinate of the diffusion screen, so that a polymer dispersed liquid crystal film corresponding to the target position coordinate is in a diffusion state.

It can be understood that voltages of the polymer dispersed liquid crystal films may be used to control the polymer dispersed liquid crystal films to switch between a transparent state and a diffusion state, and each of the polymer dispersed liquid crystal films included in the diffusion screen corresponds to one position coordinate. Therefore, a target image may be reproduced only by adjusting a polymer dispersed liquid crystal film conforming to the target position coordinate to a diffusion state, and other polymer dispersed liquid crystal films may be adjusted to a transparent state. The above polymer dispersed liquid crystal films may be Polymer Dispersed Liquid Crystal (PDLC) or Polymer Stabilized Liquid Crystal (PSLC).

The step of adjusting an angle of the concave mirror may comprise: triggering an adjustment apparatus of the concave mirror to adjust the angle of the concave mirror according to the target angle coordinate of the concave mirror. The adjustment apparatus of the concave mirror may be a specific mechanical adjustment structure.

The SLM in the present embodiment may specifically be a phase-only spatial light modulator, and is configured to load a composite superimposed kinoform, and dynamic zoom may be realized by loading kinoforms corresponding to lenses with different focal lengths. A corresponding target focal length of the lens may be obtained according to the target position coordinate of the diffusion screen, and a control apparatus of the SLM is triggered to change a focal length of the lens corresponding to kinoform of the lens loaded in the SLM according to the target focal length, so that the target image may be reproduced at a corresponding position of the diffusion screen.

Through the above adjustment process, the diffusion screen and the concave mirror of the head-up display apparatus are adjusted to the target positions, and the focal length of the lens corresponding to kinoform of the lens loaded in the spatial light modulator is changed, to reproduce the target image on the diffusion screen. Then, through the mirrors and the windshield, etc., the position of the image of the head-up display apparatus presented in front of the user finally coincides with the gazing position of the user.

The adjustment and control processes of the diffusion screen, the concave mirror and the spatial light modulator described above may be performed synchronously or in a certain logical order, which is not limited by the present disclosure.

Figure 4:
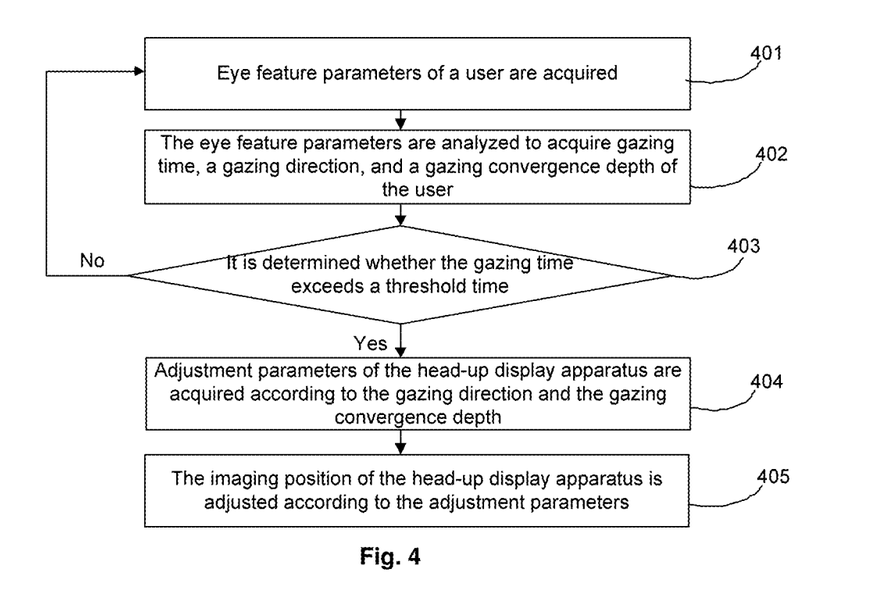
FIG. 4 is a flowchart illustrating yet another method for adjusting an imaging position according to an embodiment of the present disclosure.

As shown in FIG. 4, illustrated a flowchart of still another method for adjusting an imaging position according to an embodiment of the present disclosure. The method comprises the following steps.

In step 401, eye feature parameters of a user are acquired.

In step 402, the eye feature parameters are analyzed to acquire gazing time, a gazing direction, and a gazing convergence depth of the user.

Specific processes of the two steps described above may be known with reference to the above embodiments, and details thereof will not be described herein again.

In step 403, it is determined whether the gazing time exceeds a threshold time.

Before the adjustment parameters are acquired, it needs to determine the gazing time of the user. If the gazing time exceeds the threshold time, a parameter acquisition process is performed. For example, the threshold time may be 0.2 s, 0.5 s, 1 s, etc., and may be set according to practical conditions, which is not limited by the present disclosure.

When the gazing time exceeds the threshold time, the step of acquiring adjustment parameters is performed, and if the gazing time does not exceed the threshold time, the process returns to step 401.

In step 404, adjustment parameters of the head-up display apparatus are acquired according to the gazing direction and the gazing convergence depth.

When the gazing time of the user exceeds the threshold time, a gazing position of the user is determined according to the gazing direction and the gazing convergence depth, so as to acquire the adjustment parameters of the head-up display apparatus.

In step 405, the imaging position of the head-up display apparatus is adjusted according to the adjustment parameters.

A specific adjustment process has been described in detail in the above embodiments, and details thereof will not be described herein again.

The method for adjusting an imaging position according to the embodiment of the present disclosure is applied to a head-up display apparatus, to firstly acquire eye features of a user, analyze the eye features to acquire gazing information of the user, determine whether gazing time exceeds a threshold time, and when the gazing time exceeds the threshold time, determine adjustment parameters of the head-up display apparatus to adjust the imaging position of the head-up display apparatus to coincide with the gazing position of the user, which can effectively prevent security risks caused by switching between a distal position and a proximal position when the imaging position does not coincide with the gazing position of the user.

In the above embodiments, the adjustment of the imaging position of the head-up display apparatus can be realized. In a practical application process, a position of an eye box 9 may be ensured to be unchanged by adjusting an angle of the planar mirror 5 in an optical path or adjusting a position of the diffusion screen 3 in a plane perpendicular to a direction of the optical path, for convenience of viewing by the user.

Figure 5:
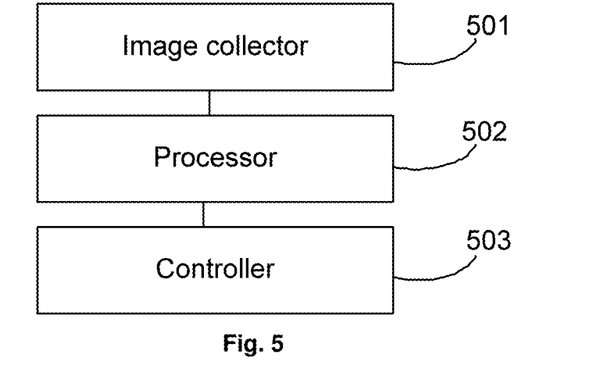
FIG. 5 is a structural block diagram illustrating an apparatus for adjusting an imaging position according to an embodiment of the present disclosure.

The embodiments of the present disclosure further provide an apparatus for adjusting an imaging position, which is applied to the head-up display apparatus described above. As shown in FIG. 5, the apparatus comprises: an image collector 501 configured to acquire eye feature parameters of a user; a processor 502 configured to analyze the eye feature parameters to acquire gazing information of the user, and determine adjustment parameters of the head-up display apparatus according to the gazing information; and a controller 503 configured to adjust the imaging position of the head-up display apparatus according to the adjustment parameters.

The apparatus for adjusting an imaging position according to the embodiment of the present disclosure is applied to the head-up display apparatus, to firstly acquire eye features of a user, analyze the eye features to acquire gazing information of the user, thereby determining adjustment parameters of the head-up display apparatus, and adjust the imaging position of the head-up display apparatus according to the adjustment parameters to coincide with the gazing position of the user, which can effectively prevent security risks caused by switching between a distal position and a proximal position when the imaging position does not coincide with the gazing position of the user.

Specifically, the eye feature parameters of the user acquired by the image collector 501 comprise: a pupil center position, a pupil size, corneal reflection information, an iris center position, an iris size etc. The gazing information of the user acquired by the processor 502 comprises information such as gazing time, a gazing direction, a gazing convergence depth, etc. The adjustment parameters of the head-up display apparatus comprise a target position coordinate of a diffusion screen and a target angle coordinate of a concave mirror.

Figure 6:
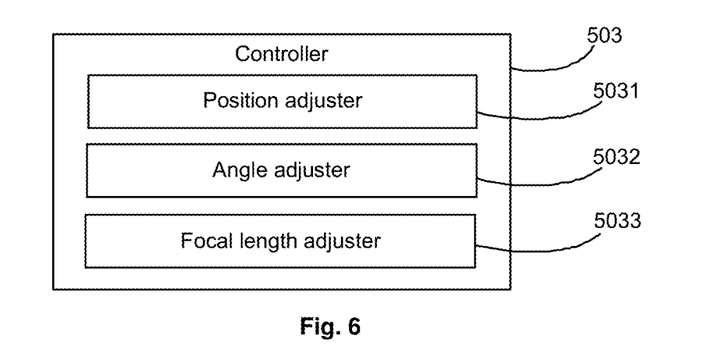
FIG. 6 is a structural block diagram illustrating a controller according to an embodiment of the present disclosure.

As shown in FIG. 6, the controller 503 may specifically comprise: a position adjuster 5031 configured to adjust a position of the diffusion screen according to the target position coordinate of the diffusion screen; an angle adjuster 5032 configured to adjust an angle of the concave mirror according to the target angle coordinate of the concave mirror; and a focal length adjuster 5033 configured to acquire a target focal length of a lens corresponding to kinoform of the lens loaded in a spatial light modulator according to the target position coordinate of the diffusion screen, to adjust a focal length of the lens, so as to adjust the imaging position of the head-up display apparatus.

Specifically, when the head-up display apparatus comprises an adjustment mechanism of the diffusion screen, the position adjuster 5031 may comprise: a trigger configured to trigger the adjustment mechanism of the diffusion screen to adjust the position of the diffusion screen according to the target position coordinate of the diffusion screen.

When the diffusion screen of the head-up display apparatus comprises multiple polymer dispersed liquid crystal films, the position adjuster 5031 comprises: a voltage regulator configured to adjust voltages of respective polymer dispersed liquid crystal films according to the target position coordinate of the diffusion screen, so that a polymer dispersed liquid crystal film corresponding to the target position coordinate is in a diffusion state, wherein the polymer dispersed liquid crystal film in the diffusion state is used to reproduce a target image.

Figure 7:
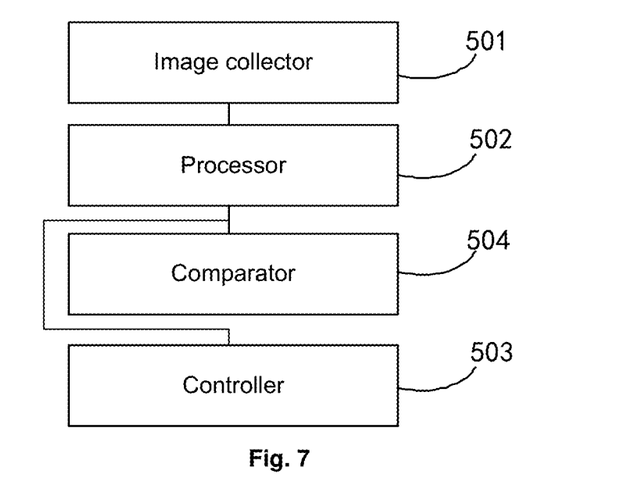
FIG. 7 is a structural block diagram illustrating another apparatus for adjusting an imaging position according to an embodiment of the present disclosure.

In addition, in another embodiment, the apparatus for adjusting an imaging position may further comprise a comparator 504. As shown in FIG. 7, the comparator 504 is connected to the processor 502 and is configured to compare the gazing time with a threshold time before the processor 502 determines adjustment parameters of the head-up display apparatus according to the gazing information. When the gazing time exceeds the threshold time, the processor 502 acquires the adjustment parameters of the head-up display apparatus according to the gazing information.

The apparatus for adjusting an imaging position according to the embodiment of the present disclosure is applied to the head-up display apparatus, to firstly acquire eye features of a user, analyze the eye features to acquire gazing information of the user, determine whether gazing time exceeds a threshold time, and when the gazing time exceeds the threshold time, determine adjustment parameters of the head-up display apparatus to adjust the imaging position of the head-up display apparatus to coincide with the gazing position of the user, which can effectively prevent security risks caused by switching between a distal position and a proximal position when the imaging position does not coincide with the gazing position of the user.

The embodiments of the present disclosure further provide a head-up display system, comprising a head-up display apparatus and the apparatus for adjusting an imaging position according to the above embodiments.

For various method embodiments described above, for the sake of brief description, they are all described as combinations of a series of actions, but it should be understood by those skilled in the art that the present disclosure is not limited by an order of the actions described, since according to the present disclosure, some steps may be performed in another order or at the same time. Secondly, it should also be understood by those skilled in the art that the actions and modules involved in the embodiments described in the specification are not necessarily required by the present disclosure.

Various embodiments in the present specification are described in a progressive manner, each embodiment focuses on differences from other embodiments, and the same or similar parts between various embodiments may be known with reference to each other. For the system embodiments, since they are substantially similar to the method embodiments, the description thereof is relatively simple, and the relevant parts may be known with reference to a part of the description of the method embodiments.

Although the embodiments of the present disclosure have been described, those skilled in the art can make additional changes and modifications to the embodiments once they are aware of the basic inventive concept. Therefore, the appended claims are intended to be construed as including the embodiments and all changes and modifications which fall within the scope of the embodiments of the present disclosure.

The above description is merely specific embodiments of the present disclosure, and the protection scope of the present disclosure is not limited thereto. Any change or substitution which may be easily reached by those skilled in the art within the technical scope of the present disclosure should be covered within the protection scope of the present disclosure. Therefore, the protection scope of the present disclosure should be determined by the protection scope of the claims.

I claim:

1. A method of adjusting an imaging position for a head-up display apparatus, the method comprising:
   acquiring eye feature parameters of a user;
   analyzing the eye feature parameters to acquire gazing information of the user;
   determining adjustment parameters of the head-up display apparatus according to the gazing information; and
   adjusting the imaging position of the head-up display apparatus according to the adjustment parameters,
   wherein the head-up display apparatus comprises a diffusion screen, a concave mirror, and a spatial light modulator,
   wherein determining adjustment parameters of the head-up display apparatus according to the gazing information comprises:
      determining a target position coordinate of the diffusion screen and a target angle coordinate of the concave mirror according to the gazing information, and
   wherein adjusting the imaging position of the head-up display apparatus according to the adjustment parameters comprises:
      adjusting a position of the diffusion screen according to the target position coordinate of the diffusion screen;
      adjusting an angle of the concave mirror according to the target angle coordinate of the concave mirror; and
      acquiring a target focal length of a lens corresponding to kinoform of the lens loaded in the spatial light modulator according to the target position coordinate of the diffusion screen, and adjusting a focal length of the lens according to the target focal length to adjust the imaging position of the head-up display apparatus.

2. The method according to claim 1, wherein adjusting a position of the diffusion screen according to the target position coordinate of the diffusion screen comprises:
   triggering a position adjustment mechanism of the diffusion screen to adjust the position of the diffusion screen according to the target position coordinate of the diffusion screen.

3. The method according to claim 1, wherein:
   the diffusion screen comprises multiple polymer dispersed liquid crystal films; and
   adjusting a position of the diffusion screen according to the target position coordinate of the diffusion screen comprises adjusting voltages of respective polymer dispersed liquid crystal films according to the target position coordinate of the diffusion screen, so that a polymer dispersed liquid crystal film corresponding to the target position coordinate is in a diffusion state.

4. The method according to claim 1, wherein
   the eye feature parameters comprise a pupil center position, a pupil size, corneal reflection information, an iris center position, and an iris size; and
   the gazing information comprises gazing time, a gazing direction, and a gazing convergence depth.

5. The method according to claim 4, wherein before determining adjustment parameters of the head-up display apparatus according to the gazing information, the method further comprising:
   determining whether the gazing time exceeds a threshold time, and when the gazing time exceeds the threshold time, determining adjustment parameters of the head-up display apparatus according to the gazing information.

6. An apparatus of adjusting an imaging position for a head-up display apparatus, the apparatus comprising:
   an image collector configured to acquire eye feature parameters of a user;
   a processor configured to analyze the eye feature parameters to acquire gazing information of the user, and determine adjustment parameters of the head-up display apparatus according to the gazing information; and
   a controller configured to adjust the imaging position of the head-up display apparatus according to the adjustment parameters,
   wherein the head-up display apparatus comprises a diffusion screen, a concave mirror, and a spatial light modulator, and the adjustment parameters comprise a target position coordinate of the diffusion screen and a target angle coordinate of the concave mirror, and
   wherein the controller comprises:
      a position adjuster configured to adjust a position of the diffusion screen according to the target position coordinate of the diffusion screen;
      an angle adjuster configured to adjust an angle of the concave mirror according to the target angle coordinate of the concave mirror; and
      a focal length adjuster configured to acquire a target focal length of a lens corresponding to kinoform of the lens loaded in the spatial light modulator according to the target position coordinate of the diffusion screen, and adjust a focal length of the lens according to the target focal length to adjust the imaging position of the head-up display apparatus.

7. The apparatus according to claim 6, wherein the position adjuster comprises a trigger configured to trigger a position adjustment mechanism of the diffusion screen to adjust the position of the diffusion screen according to the target position coordinate of the diffusion screen.

8. The apparatus according to claim 6, wherein:
   the diffusion screen comprises multiple polymer dispersed liquid crystal films; and
   the position adjuster comprises a voltage adjuster configured to adjust voltages of respective polymer dispersed liquid crystal films according to the target position coordinate of the diffusion screen, so that a polymer dispersed liquid crystal film corresponding to the target position coordinate is in a diffusion state.

9. The apparatus according to claim 6, wherein:
   the eye feature parameters comprise a pupil center position, a pupil size, corneal reflection information, an iris center position, and an iris size; and
   the gazing information comprises gazing time, a gazing direction, and a gazing convergence depth.

10. The apparatus according to claim 9, further comprising a comparator configured to, before the processor determines the adjustment parameters of the head-up display apparatus according to the gazing information, compare the gazing time with a threshold time,
    wherein when the gazing time exceeds the threshold time, the processor acquires the adjustment parameters of the head-up display apparatus according to the gazing information.

11. A head-up display system, comprising a head-up display apparatus and the apparatus according to claim 6.

* * * * *